US005701344A

United States Patent [19]
Wakui

[11] Patent Number: 5,701,344
[45] Date of Patent: Dec. 23, 1997

[54] AUDIO PROCESSING APPARATUS

[75] Inventor: Tetsuya Wakui, Yokohama, Japan

[73] Assignee: Canon Kabushiki Kaisha, Tokyo, Japan

[21] Appl. No.: 692,332

[22] Filed: Aug. 5, 1996

[30] Foreign Application Priority Data

| | | | |
|---|---|---|---|
| Aug. 23, 1995 | [JP] | Japan | 7-235930 |
| Jul. 18, 1996 | [JP] | Japan | 8-189325 |

[51] Int. Cl.[6] .......... H04S 1/00; H04B 15/00; H04R 3/00

[52] U.S. Cl. .......... 381/1; 381/94; 381/92

[58] Field of Search .......... 381/1, 26, 27, 381/92, 94

[56] References Cited

U.S. PATENT DOCUMENTS

| | | | |
|---|---|---|---|
| 4,192,969 | 3/1980 | Iwahara | 381/1 |
| 4,308,423 | 12/1981 | Cohen | 381/1 |
| 4,980,914 | 12/1990 | Konugi et al. | 381/1 |

*Primary Examiner*—Forester W. Isen
*Attorney, Agent, or Firm*—Robin, Blecker, Daley and Driscoll

[57] ABSTRACT

An audio processing apparatus is arranged to be capable of attenuating only an unnecessary wind noise without cutting off the low frequency part of sounds picked up. In the apparatus, a first low frequency band signal and a first high frequency band signal are extracted from a signal obtained by subtracting a delayed right-side audio signal from a received left-side audio signal. A second low frequency band signal and a second high frequency band signal are extracted from a signal obtained by subtracting a delayed left-side audio signal from a received right-side audio signal. An addition signal is formed by adding together the extracted first low frequency band signal and the extracted second low frequency band signal. The extracted first low frequency band signal and the addition signal are added together in an arbitrary variable addition ratio to obtain a first variable addition signal. The extracted second low frequency band signal and the addition signal are also added together in an arbitrary variable addition ratio to obtain a second variable addition signal. The extracted first high frequency band signal is outputted with the first variable addition signal added thereto, while the extracted second high frequency band signal is outputted with the second variable addition signal added thereto.

6 Claims, 3 Drawing Sheets

AUDIO PROCESSING APPARATUS

BACKGROUND OF THE INVENTION

1. Field of the Invention

This invention relates to an audio processing apparatus arranged to be capable of lessening noises of wind mixing in sounds being picked up by microphones.

2. Description of the Related Art

Recording and reproducing apparatuses of the kind having microphones include, for example, a tape recorder and a camera-integrated type video tape recorder. The camera-integrated type video tape recorder is often used outdoors and, in such a case, is apt to be affected by the wind in recording sounds. A wind noise peculiar to the microphone then tends to affect sounds being picked up by the microphone.

To prevent the adverse effect of the wind noise, there is a method of mounting a wind screen on a sound pickup port of the microphone. This method is deemed to be most effective and efficient. However, in order to enhance the effect of reducing the wind noise by this method, the size of the wind screen to be used for covering the sound pickup port of the microphone inevitably increases too much for an apparatus such as a camera-integrated type video tape recorder that is arranged to make a feature of its compactness.

To solve this problem, since the wind noise is distributed mostly in the low frequency band of sound, an audio processing circuit has been developed as shown in FIG. 1. Referring to FIG. 1, a sound which is mainly obtained on the left side of the apparatus is converted into an audio signal by a left microphone (not shown). The left audio signal is inputted from an input terminal 21. The input audio signal is amplified by an amplifier 23. The audio signal has two routes. The amplified audio signal either comes directly to a change-over switch 27 on one route or comes to the change-over switch 27 via a high-pass filter (hereinafter referred to as HPF) 25 on the other route. The output of the change-over switch 27 is supplied via an output terminal 29 to an audio processing circuit (not shown). In the same way, a sound which is mainly obtained on the right side is converted into an audio signal by a right microphone (not shown). The right audio signal thus obtained is inputted from an input terminal 22. The input audio signal is amplified by an amplifier 24. The right amplified audio signal also has two routes. The amplified audio signal either comes directly to a change-over switch 28 on one route or comes via an HPF 26 to the change-over switch 28 on the other route. The output of the change-over switch 28 is supplied via an output terminal 30 to an audio processing circuit (not shown).

Normally, when there is no adverse effect of the wind, the change-over switches 27 and 28 are in their "off" positions to allow the audio signals amplified by the amplifiers 23 and 24 to be outputted as they are. In a case where the wind is blowing, the change-over switches 27 and 28 are turned to their "on" positions to allow the amplified audio signals to pass through the HPFs 25 and 26 in such a way as to attenuate the low sound frequency band components of these audio signals which include the wind noise in large amounts. The level of the wind noise is thus lowered by the above-stated arrangement. The effect of reducing the wind noise can be varied by varying the setting value of each of the HPFs 25 and 26.

According to the above-stated method of the prior art, however, if the characteristic of the HPF is set in such a way as to attain a greater wind-noise reducing effect, the low sound frequency band of the audio signal is also cut off together with the noise, thereby making a picked-up sound unnatural. Further, if the characteristic of the HPF is set to lessen the adverse effect of the wind-noise reducing process on the picked up sound, on the other hand, the wind-noise reducing effect becomes too low.

SUMMARY OF THE INVENTION

It is a general object of this invention to provide an audio processing apparatus arranged to be capable of solving the problems of the prior art.

It is a more specific object of this invention to provide an audio processing apparatus arranged to be capable of attenuating only an undesired wind noise component without cutting off any low frequency band component of sounds to be picked up.

Under this object, an audio processing apparatus arranged as an embodiment of this invention to process an audio signal comprises a first input terminal arranged to receive a left-side audio signal composed mainly of an audio signal corresponding to a sound coming from a left side, a second input terminal arranged to receive a right-side audio signal composed mainly of an audio signal corresponding to a sound coming from a right side, first delay means for delaying the left-side audio signal received by the first input terminal to output a resultant signal, second delay means for delaying the right-side audio signal received by the second input terminal to output a resultant signal, first subtraction means for subtracting the signal outputted from the second delay means from the left-side audio signal received by the first input terminal to output a resultant signal, second subtraction means for subtracting the signal outputted from the first delay means from the right-side audio signal received by the second input terminal to output a resultant signal, first frequency band signal extraction means for extracting from the signal outputted from the first subtraction means a first low frequency band signal and a first high frequency band signal to output the first low frequency band signal and the first high frequency band signal, second frequency band signal extraction means for extracting from the signal outputted from the second subtraction means a second low frequency band signal and a second high frequency band signal to output the second low frequency band signal and the second high frequency band signal, first addition means for adding together the first low frequency band signal outputted from the first frequency band signal extraction means and the second low frequency band signal outputted from the second frequency band signal extraction means to output a resultant signal, second addition means for adding together the first high frequency band signal outputted from the first frequency band signal extraction means and the signal outputted from the first addition means to output a resultant signal, and third addition means for adding together the second high frequency band signal outputted from the second frequency band signal extraction means and the signal outputted from the first addition means to output a resultant signal.

It is a further object of this invention to provide an audio processing apparatus arranged to be capable of continuously attenuating only a disagreeable wind noise almost completely without bringing about any adverse effect on the low frequency band component of a sound to be picked up.

Under that object, an audio processing apparatus arranged as another embodiment of this invention to process an audio signal comprises a first input terminal arranged to receive a left-side audio signal composed mainly of an audio signal corresponding to a sound coming from a left side, a second input terminal arranged to receive a right-side audio signal composed mainly of an audio signal corresponding to a sound coming from a right side, first delay means for delaying the left-side audio signal received by the first input terminal to output a resultant signal, second delay means for delaying the right-side audio signal received by the second input terminal to output a resultant signal, first subtraction means for subtracting the signal outputted from the second delay means from the left-side audio signal received by the first input terminal to output a resultant signal, second subtraction means for subtracting the signal outputted from the first delay means from the right-side audio signal received by the second input terminal to output a resultant signal, first frequency band signal extraction means for extracting from the signal outputted from the first subtraction means a first low frequency band signal and a first high frequency band signal to output the first low frequency band signal and the first high frequency band signal, second frequency band signal extraction means for extracting from the signal outputted from the second subtraction means a second low frequency band signal and a second high frequency band signal to output the second low frequency band signal and the second high frequency band signal, first addition means for adding together the first low frequency band signal outputted from the first frequency band signal extraction means and the second low frequency band signal outputted from the second frequency band signal extraction means to output a resultant signal, variable addition means for adding together, in a variable arbitrary addition ratio, the first low frequency band signal outputted from the first frequency band signal extraction means and the signal outputted from the first addition means to output a first variable addition signal and for adding together, in a variable arbitrary addition ratio, the second low frequency band signal outputted from the second frequency band signal extraction means and the signal outputted from the first addition means to output a second variable addition signal, second addition means for adding together the first high frequency band signal outputted from the first frequency band signal extraction means and the first variable addition signal outputted from the variable addition means to output a resultant signal, and third addition means for adding together the second high frequency band signal outputted from the second frequency band signal extraction means and the second variable addition signal outputted from the variable addition means to output a resultant signal.

It is a still further object of this invention to provide an audio processing apparatus arranged to be capable of attenuating, only when necessary, a wind noise without bringing about almost no adverse effect on the low frequency band component of a sound to be picked up.

Under that object, an audio processing apparatus arranged as a further embodiment of this invention to process an audio signal comprises a first input terminal arranged to receive a left-side audio signal composed mainly of an audio signal corresponding to a sound coming from a left side, a second input terminal arranged to receive a right-side audio signal composed mainly of an audio signal corresponding to a sound coming from a right side, first delay means for delaying the left-side audio signal received by the first input terminal to output a resultant signal, second delay means for delaying the right-side audio signal received by the second input terminal to output a resultant signal, first subtraction means for subtracting the signal outputted from the second delay means from the left-side audio signal received by the first input terminal to output a resultant signal, second subtraction means for subtracting the signal outputted from the first delay means from the right-side audio signal received by the second input terminal to output a resultant signal, first frequency band signal extraction means for extracting from the signal outputted from the first subtraction means a first low frequency band signal and a first high frequency band signal to output the first low frequency band signal and the first high frequency band signal, second frequency band signal extraction means for extracting from the signal outputted from the second subtraction means a second low frequency band signal and a second high frequency band signal to output the second low frequency band signal and the second high frequency band signal, first addition means for adding together the first low frequency band signal outputted from the first frequency band signal extraction means and the second low frequency band signal outputted from the second frequency band signal extraction means to output a resultant signal, selective output means for selecting one of the first low frequency band signal outputted from the first frequency band signal extraction means and the signal outputted from the first addition means to output the selected one as a first selection signal and for selecting one of the second low frequency band signal outputted from the second frequency band signal extraction means and the signal outputted from the first addition means to output the selected one as a second selection signal, second addition means for adding together the first high frequency band signal outputted from the first frequency band signal extraction means and the first selection signal outputted from the selective output means to output a resultant signal, and third addition means for adding together the second high frequency band signal outputted from the second frequency band signal extraction means and the second selection signal outputted from the selective output means to output a resultant signal.

The above and other objects and features of this invention will become apparent from the following detailed description of embodiments thereof taken in conjunction with the accompanying drawings.

DETAILED DESCRIPTION OF THE PREFERRED EMBODIMENTS

A first embodiment of this invention is described in detail with reference to FIG. 2 as follows.

Figure 1:
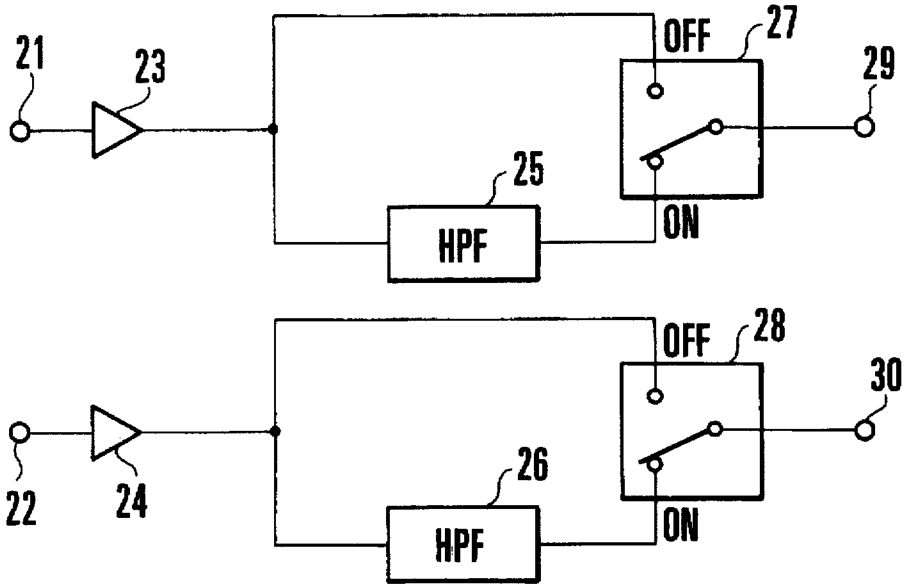
FIG. 1 is a block diagram showing the arrangement of the conventional audio processing circuit.
Figure 2:
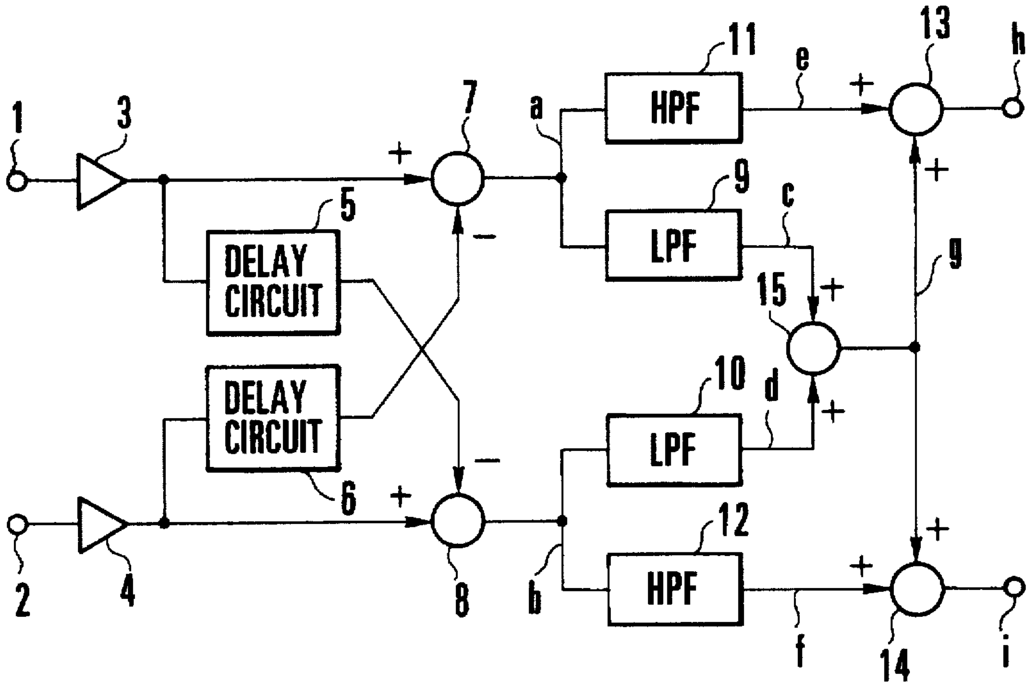
FIG. 2 is a block diagram showing the arrangement of an audio processing apparatus arranged according to this invention as a first embodiment thereof.

Referring to FIG. 2, a microphone of a left channel is connected to an input terminal 1. A microphone of a right channel is connected to another input terminal 2. A left-side audio signal L which is composed mainly of an audio signal corresponding to a sound coming from the left side of the apparatus is inputted to the input terminal 1 from the left-channel microphone. A right-side audio signal R which is composed mainly of an audio signal corresponding to a sound coming from the right side of the apparatus is inputted to the input terminal 2 from the right-channel microphone. The left-side audio signal L is supplied to an amplifier 3 and, then, to a delay circuit 5. The right-side audio signal R is supplied to an amplifier 4 and, then, to a delay circuit 6. The output of the amplifier 3 and the output of the delay circuit 6 are connected to a subtraction circuit 7. Signals from the amplifier 3 and the delay circuit 6 are subjected to a subtraction process at the subtraction circuit 7. The output of the amplifier 4 and the output of the delay circuit 5 are connected to a subtraction circuit 8. Signals from the amplifier 4 and the delay circuit 5 are subjected to a subtraction process at the subtraction circuit 8.

It is ideal that the input terminal 1 receives an audio signal only for sounds coming from the left side and the input terminal 2 receives an audio signal only for sounds coming from the right side. Due to the performance of two microphones in use, however, it is inevitable to have sounds on right and left sides picked up in an intermixed state. In a case where the microphones have no directivity, in particular, audio signals coming from the left and right microphones tend to have no difference between them and thus give no stereophonic effect. To solve this problem, the apparatus according to the first embodiment of this invention enhances a channel separating merit in the following manner. A phase difference between the audio signals obtained from the two microphones is utilized by delaying the audio signals by subtracting these audio signals from each other in such a way as to attenuate the mixed-in signal components of the audio signals.

Assume that a wind noise component WL is mixed in the left-side audio signal L coming to the input terminal 1 and a wind noise component WR is mixed in the right-side audio signal R coming to the input terminal 2. The input audio signal from the input terminal 1 is expressed as L+WL. The input audio signal L+WL is amplified by the amplifier 3. The output of the amplifier 3 still remains in the state of L+WL as the signal components remain unchanged by amplification. The signal L+WL is thus supplied as it is to the subtraction circuit 7 and the delay circuit 5. The input audio signal from the input terminal 2 is likewise outputted from the amplifier 4 as an audio signal R+WR.

If LPFs (low-pass filters) are employed as the delay circuits 5 and 6, the input audio signals L+WL and R+WR become as follows. The left-side audio signal L can be considered to be divided into a left-side audio low frequency band component LL and a left-side audio high frequency band component LH. In other words, in this instance, the output of the delay circuit 5 becomes a signal which can be expressed as LL+LH+WL.

The audio signal to be supplied to the delay circuit 6 likewise becomes a signal expressed as RL+RH+WR.

Then, since the delay circuit 5 is an LPF, an audio low band component of the output of the delay circuit 5 is allowed to pass without delay and without attenuation, while a higher frequency component is delayed and attenuated. As a result, with the delayed and attenuated high frequency band component of the left-side audio high frequency band component LH assumed to be I, the output of the delay circuit 5 can be expressed as LL+I+WL, as the wind noise component WL is a low band component as is not delayed nor attenuated.

Assuming that a high frequency band component obtained by delaying and attenuating the right-side audio high frequency band component RH is "r", the output of the delay circuit 6 becomes a signal expressed as RL+r+WR.

Therefore, the input signal of the subtraction circuit 7 becomes LL+LH+WL−(RL+r+WR). An output signal "a" of the subtraction circuit 7 becomes a signal which can be expressed as (LL−RL)+(LH−r)+(WL−WR).

In the formula above, the first and second terms represent audio signals. Therefore, they can be handled as audio composite signals having a phase difference between them. The wind noise component, on the other hand, is brought forth by the structural factor of the microphone and mainly consists of a vortex flow of air. Therefore, the wind noise components picked up by the right and left microphones are not correlated to each other and thus cannot be handled as a composite signal. Therefore, assuming that (LL−RL)=LL' and (LH−r)=LH', the output signal "a" of the subtraction circuit 7 can be expressed as LL'+LH'+(WL−WR).

An output signal "b" of the subtraction circuit 8 likewise becomes a signal expressed as RL'+RH'+(WR−WL).

Subsequently, the output signal "a" of the subtraction circuit 7 is divided into a high frequency band component and a low frequency band component by an LPF 9 and an HPF 11. Then, an output signal "c" of the LPF 9 becomes a signal expressed as LL'+(WL−WR). An output signal "e" of the HPF 11 becomes a signal expressed as LH'.

The output signal "b" of the subtraction circuit 8 is likewise supplied to an LPF 10 and an HPF 12. Then, an output signal "d" of the LPF 10 becomes a signal expressed as RL'+(WR−WL). An output signal "f" of the HPF 12 becomes a signal expressed as RH'.

The signals "c" and "d" are supplied to an addition circuit 15 to be added together to output a signal "g". The signal "g" outputted from the addition circuit 15 becomes a signal expressed as LL'+(WL−WR)+RL'+(WR−WL)=LL'+RL'. Accordingly, the wind noise is thus canceled out to zero. It is apparent that remaining signal components are composite signals obtained from the low frequency band components of the input audio signals.

A final output audio signal "h" becomes a signal expressed as LH'+LL'+RL', after the output signal "e" of the HPF 11 and the output signal "g" of the addition circuit 15 are added together by an addition circuit 13. Another final output audio signal "i" becomes a signal expressed as RH'+LL'+RL', after the output signal "f" of the HPF 12 and the output signal "g" of the addition circuit 15 are added together by an addition circuit 14.

In other words, the audio low frequency band components of the left-side and right-side audio signals become composite audio signals obtained by combining the left-side and right-side audio signals. However, the composite audio signals present almost no problem, because the human hearing perception is not keen enough to detect any difference in channel separation for the region of the low frequency band component of the audio signal and a generating direction of a low-pitched sound is detected on the basis of a higher harmonic component of the low-pitched sound.

Unlike the conventional arrangement described in the foregoing, the low frequency band component of the audio signal is never attenuated in attenuating a wind noise component by the embodiment of this invention. In other words, the embodiment is arranged to be capable of attenuating only the disagreeable wind noise component without affecting the low frequency band component of the sound picked up by the apparatus.

Figure 3:
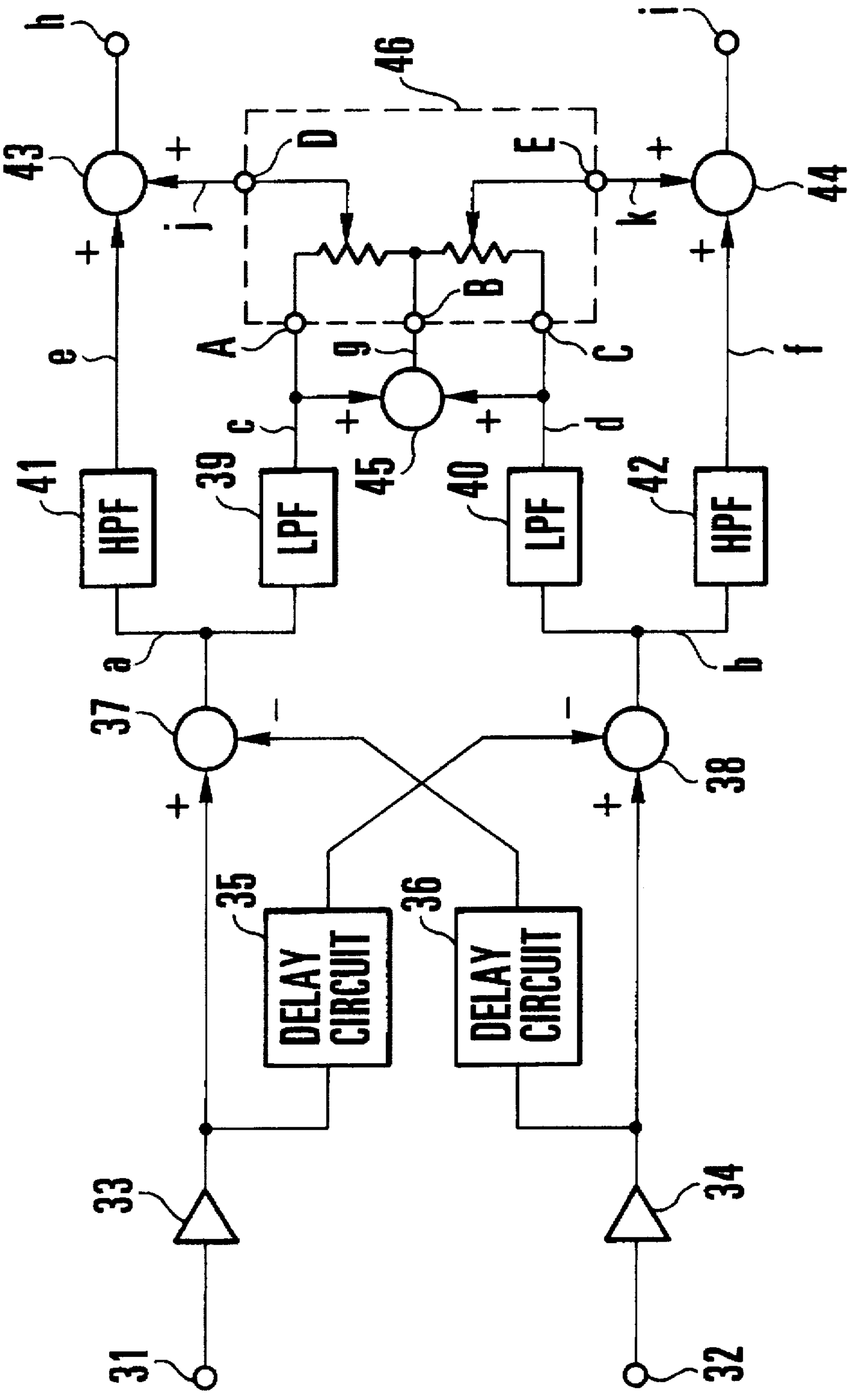
FIG. 3 is a block diagram showing the arrangement of an audio processing apparatus arranged according to this invention as a second embodiment thereof.

A second embodiment of this invention which is shown in FIG. 3 is next described in detail below.

Referring to FIG. 3, a microphone of a left channel is connected to an input terminal 31. A microphone of a right channel is connected to another input terminal 32. A left-side audio signal L which is composed mainly of an audio signal corresponding to a sound coming from the left side of the apparatus is inputted to the input terminal 31 from the left-channel microphone. A right-side audio signal R which is composed mainly of an audio signal corresponding to a sound coming from the right side of the apparatus is inputted to the input terminal 32 from the right-channel microphone. The left-side audio signal L is supplied to an amplifier 33 and, then, to a delay circuit 35. The right-side audio signal R is supplied to an amplifier 34 and, then, to a delay circuit 36. The output of the amplifier 33 and the output of the delay circuit 36 are connected to a subtraction circuit 37. Signals from the amplifier 33 and the delay circuit 36 are subjected to a subtraction process at the subtraction circuit 37. The output of the amplifier 34 and the output of the delay circuit 35 are connected to a subtraction circuit 38. Signals from the amplifier 34 and the delay circuit 35 are subjected to a subtraction process at the subtraction circuit 38.

It is ideal that the input terminal 31 receives an audio signal only for sounds coming from the left side and the input terminal 32 receives an audio signal only for sounds coming from the right side. Due to the performance of two microphones in use, however, it is inevitable to have sounds on right and left sides picked up in an intermixed state. In a case where the microphones have no directivity, in particular, audio signals coming from the left and right microphones tend to have no difference between them and thus give no stereophonic effect. To solve this problem, the apparatus according to the second embodiment of this invention enhances a channel separating merit in the following manner. A phase difference between the audio signals obtained from the two microphones is utilized by delaying the audio signals by subtracting these audio signals from each other in such a way as to attenuate the mixed-in signal components of the audio signals.

Assume that a wind noise component WL is mixed in the left-side audio signal L coming to the input terminal 31 and a wind noise component WR is mixed in the right-side audio signal R coming to the input terminal 32. The input audio signal from the input terminal 31 is expressed as L+WL. The input audio signal L+WL is amplified by the amplifier 33. The output of the amplifier 33 still remains in the state of L+WL as the signal components remain unchanged by amplification. The signal L+WL is thus supplied as it is to the subtraction circuit 37 and the delay circuit 35. The input audio signal from the input terminal 32 is likewise outputted from the amplifier 34 as an audio signal R+WR.

If LPFs (low-pass filters) are employed as the delay circuits 35 and 36, the input audio signals L+WL and R+WR become as follows. The left-side audio signal L can be considered to be divided into a left-side audio low frequency band component LL and a left-side audio high frequency band component LH. In other words, in this instance, the output of the delay circuit 35 becomes a signal which can be expressed as LL+LH+WL.

The audio signal to be supplied to the delay circuit 36 likewise becomes a signal expressed as RL+RH+WR.

Then, since the delay circuit 35 is an LPF, an audio low band component of the output of the delay circuit 35 is allowed to pass without delay and without attenuation, while a higher frequency component is delayed and attenuated. As a result, with the delayed and attenuated high frequency band component of the left-side audio high frequency band component LH assumed to be I, the output of the delay circuit 35 can be expressed as LL+I+WL, as the wind noise component WL is a low band component as is not delayed nor attenuated.

Assuming that a high frequency band component obtained by delaying and attenuating the right-side audio high frequency band component RH is "r", the output of the delay circuit 36 becomes a signal expressed as RL+r+WR.

Therefore, the input signal of the subtraction circuit 37 becomes LL+LH+WL−(RL+r+WR). An output signal "a" of the subtraction circuit 37 becomes a signal which can be expressed as (LL−RL)+(LH−r)+(WL−WR).

In the formula above, the first and second terms represent audio signals. Therefore, they can be handled as audio composite signals having a phase difference between them. The wind noise component, on the other hand, is brought forth by the structural factor of the microphone and mainly consists of a vortex flow of air. Therefore, the wind noise components picked up by the right and left microphones are not correlated to each other and thus cannot be handled as a composite signal. Therefore, assuming that (LL−RL)=LL'and (LH−r)=LH', the output signal "a" of the subtraction circuit 37 can be expressed as LL'+LH'+(WL−WR).

An output signal "b" of the subtraction circuit 38 likewise becomes a signal expressed as RL'+RH'+(WR−WL).

The output signal "a" of the subtraction circuit 37 is divided into a high frequency band component and a low frequency band component by an LPF 39 and an HPF 41. An output signal "c" of the LPF 39 becomes a signal expressed as LL'+(WL−WR). An output signal "e" of the HPF 41 becomes a signal expressed as LH'. The output signal "c" of the LPF 39 is supplied to an addition circuit 45 and an input terminal A of a level adjuster 46. The output signal "b " of the subtraction circuit 38 is likewise supplied to an LPF 40 and an HPF 42. An output signal "d" of the LPF 40 becomes a signal expressed as RL'+(WR−WL) and is supplied to the addition circuit 45 and an input terminal C of the level adjuster 46. An output signal "f" of the HPF 42 becomes a signal expressed as RH'.

Therefore, an output signal "g" of the addition circuit 45 becomes a signal expressed as LL'+(WL−WR)+RL'+(WR−WL)=LL'+RL'. The wind noise component is thus canceled out to become zero. It is apparent that a remaining component is a composite signal of the low frequency band components of the input audio signals.

The output signal "g" of the addition circuit 45 is supplied to an input terminal B of the level adjuster 46. The lever adjuster 46 is arranged to be capable of simultaneously and continuously varying a mixing ratio between the signal inputted from the input terminal A and the signal inputted from the input terminal B and a mixing ratio between the signal inputted from the input terminal C and the signal inputted from the input terminal B. The level adjuster 46 has variable output terminals D and E arranged to output signals "j" and "k", respectively. The signal "j" is obtained by mixing in a variable ratio the input signal "c" coming from the input terminal A and the input signal "g" coming from the input terminal B.

Assuming that a coefficient n ($0 \leqq n \leqq 1$) which indicates the connecting position of the variable output terminal D becomes "1" when the variable output terminal D is connected to the input terminal A, the signal "j" outputted from the variable output terminal D can be expressed as $j=c \cdot n+g(1-n)$. Assuming likewise that a coefficient n ($0 \leqq n \leqq 1$) which indicates the connecting position of the variable output terminal E becomes "1" when the variable output terminal E is connected to the input terminal C, the signal "k" outputted from the variable output terminal E can be expressed as $k=d \cdot n+g(1-n)$.

As apparent from the formulas shown above, the connecting positions of the variable output terminals D and E are arranged to vary in a manner of being interlocked with each other. In other words, the connecting position of the variable output terminal E comes, for example, nearer to the input terminal C accordingly as the connecting position of the variable output terminal D comes nearer to the input terminal A.

When the connecting positions of both the variable output terminals D and E are for the input terminal B, both the signals "j" and "k" outputted from the variable output terminals D and E become the signal "g" outputted from the addition circuit 45.

Accordingly, a final output signal "h" which is a composite signal obtained by adding together the signals "j" and "e" at an addition circuit 43 can be expressed as follows. Since the signals "j" and "e" are expressed as $j=(LL'+(WL-WR))\cdot n+(LL'+RL')\cdot(1\cdot n)$, and $e=LH'$, $h=j+e$ $=LL'\cdot n+(LL'+RL')\cdot(1-n)+(WL-WR)\cdot n+LH'$ $=LL'+(1-n)RL'+(WL-WR)\cdot n+LH'$.

A final output signal "i" which is a composite signal obtained by adding together the signals "k" and "f" at an addition circuit 44 can be likewise expressed as follows. Since the signals "k" and "f" are expressed as $k=(RL'+(WR-WL))\cdot n\ (LL'+RL')\cdot(1-n)$, and $f=RH'$, $i=RL'+(1\cdot n)LL'+(WR-WL)\cdot n+RH'$.

In other words, in a case where the coefficient n which indicates the connecting position of each of the variable output terminals D and E of the level adjuster 46 is zero, there is obtained a maximum reducing effect on the wind noise component (WR−WL). In that case, the final output signals "h" and "i" become $h=LL'+RL'+LH'$ and $i=RL'+LL'+RH'$.

As apparent from these formulas, with respect to the audio low frequency band component, composite audio signals are obtained by combining the left-side and right-side audio signals. However, the composite signal presents little problem, because the human hearing sensation is not keen enough to detect the channel separation for the low band component of the audio signal. In cases where there is almost no wind like in the case of indoor recording or where a realistic impression can be attained by picking up a wind noise in a suitable volume, for example, the wind noise reducing effect does not have to be maximized. The embodiment of this invention is arranged, therefore, to have the connecting positions of the variable output terminals D and E of the level adjuster 46, in such a case, brought respectively nearer to the input terminals A and C.

For example, assuming that the value of the coefficient n indicating the connecting position of each of the variable output terminals D and E is 0.5, the signals "h" and "i" outputted from the variable output terminals D and E can be expressed as $h=LL'+0\cdot5RL'+0.5(WL-WR)+LH'$ $i=RL'+0.5LL'+0.5(WR-WL)+RH'$.

In this instance, the level of the wind noise component becomes one half of the level of the wind noise obtained without no wind noise reducing effect.

The second embodiment of this invention is thus arranged to make the wind noise reducing amount adjustable by varying the connecting positions of the variable output terminals D and E of the level adjuster 46 in the manner described above.

A third embodiment of this invention is next described below with reference to FIG. 4.

Figure 4:
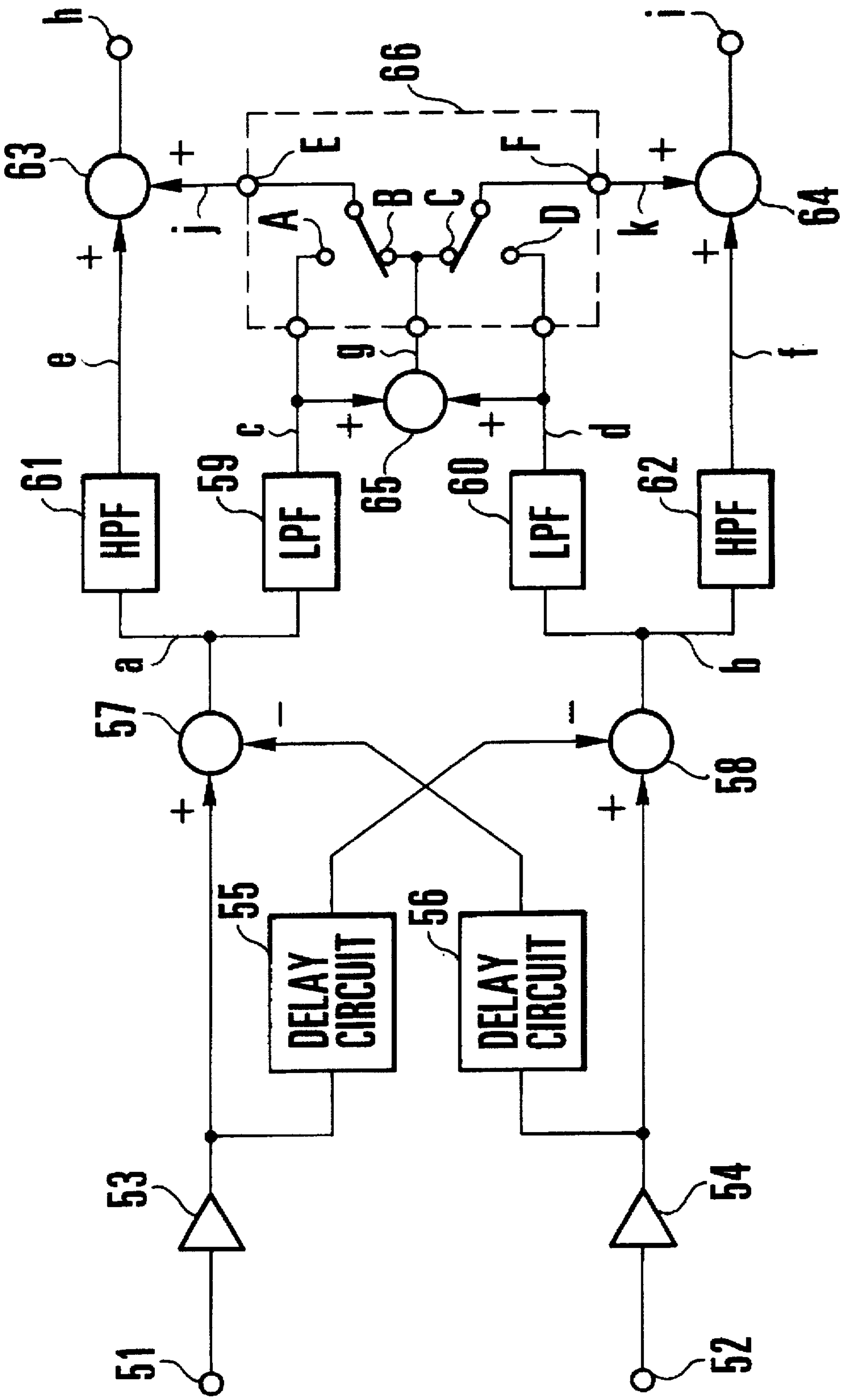
FIG. 4 is a block diagram showing the arrangement of an audio processing apparatus arranged according to this invention as a third embodiment thereof.

In FIG. 4, reference numerals 51 to 65 denote parts which are arranged in the same manner as the parts 31 to 45 of the second embodiment described above and shown in FIG. 3. The details of these parts 51 to 65 are, therefore, omitted from the following description.

Referring to FIG. 4, a switch 66 is arranged to have an input signal "c" at a contact A, an input signal "d" at a contact D and an input signal "g" at contacts B and C. An output terminal E of the switch 66 is arranged to selectively output the input signals coming from the contacts A and B. Another output terminal F of the switch 66 is arranged to selectively output the input signals coming from the contacts D and C. In this case, the signal "c" is a low frequency band component of an audio signal of the left channel and includes a wind noise. The signal "g" is a composite audio signal which consists of low frequency band components of the audio signals of the right and left channels. The signal "d" is a low frequency band component of the audio signal of the right channel and includes a wind noise.

When an operation switch (not shown) is operated to give an instruction for canceling a wind noise reducing effect, the switch 66 acts to bring about a state of having no wind noise reducing effect by connecting the output terminal E to the contact A and connecting the output terminal F to the contact D. When the operation switch is operated to give an instruction for obtaining the wind noise reducing effect, the switch 66 acts to give a maximum wind noise reducing effect by connecting the output terminal E to the contact B and connecting the output terminal F to the contact C.

In short, in the third embodiment, the switch 66 is arranged to permit turning-on and turning-off of the process of reducing a wind noise, so that the wind noise reducing effect can be selected only when the wind noise reducing effect is desired.

Each of the audio processing apparatuses according to the second and third embodiments of this invention is arranged either to be capable of continuously attenuating a disagreeable wind noise only to a necessary degree or to be capable of turning-on or turning-off the wind noise reducing effect as necessary.

What is claimed is:

1. An audio processing apparatus for processing an audio signal, comprising:

a) a first input terminal arranged to receive a left-side audio signal composed mainly of an audio signal corresponding to a sound coming from a left side;

b) a second input terminal arranged to receive a right-side audio signal composed mainly of an audio signal corresponding to a sound coming from a right side;

c) first delay means for delaying the left-side audio signal received by said first input terminal to output a resultant signal;

d) second delay means for delaying the right-side audio signal received by said second input terminal to output a resultant signal;

e) first subtraction means for subtracting the signal outputted from said second delay means from the left-side audio signal received by said first input terminal to output a resultant signal;

f) second subtraction means for subtracting the signal outputted from said first delay means from the right-side audio signal received by said second input terminal to output a resultant signal;

g) first frequency band signal extraction means for extracting from the signal outputted from said first subtraction means a first low frequency band signal and a first high frequency band signal to output the first low frequency band signal and the first high frequency band signal;

h) second frequency band signal extraction means for extracting from the signal outputted from said second subtraction means a second low frequency band signal and a second high frequency band signal to output the second low frequency band signal and the second high frequency band signal;

i) first addition means for adding together the first low frequency band signal outputted from said first frequency band signal extraction means and the second low frequency band signal outputted from said second frequency band signal extraction means to output a resultant signal;

j) second addition means for adding together the first high frequency band signal outputted from said first frequency band signal extraction means and the signal outputted from said first addition means to output a resultant signal; and k) third addition means for adding together the second high frequency band signal outputted from said second frequency band signal extraction means and the signal outputted from said first addition means to output a resultant signal.

2. An apparatus according to claim 1, wherein each of said first delay means and said second delay means includes a low-pass filter arranged to extract a low frequency band component of a predetermined frequency band.

3. An audio processing apparatus for processing an audio signal, comprising:

a) a first input terminal arranged to receive a left-side audio signal composed mainly of an audio signal corresponding to a sound coming from a left side;

b) a second input terminal arranged to receive a right-side audio signal composed mainly of an audio signal corresponding to a sound coming from a right side;

c) first delay means for delaying the left-side audio signal received by said first input terminal to output a resultant signal;

d) second delay means for delaying the right-side audio signal received by said second input terminal to output a resultant signal;

e) first subtraction means for subtracting the signal outputted from said second delay means from the left-side audio signal received by said first input terminal to output a resultant signal;

f) second subtraction means for subtracting the signal outputted from said first delay means from the right-side audio signal received by said second input terminal to output a resultant signal;

g) first frequency band signal extraction means for extracting from the signal outputted from said first subtraction means a first low frequency band signal and a first high frequency band signal to output the first low frequency band signal and the first high frequency band signal;

h) second frequency band signal extraction means for extracting from the signal outputted from said second subtraction means a second low frequency band signal and a second high frequency band signal to output the second low frequency band signal and the second high frequency band signal;

i) first addition means for adding together the first low frequency band signal outputted from said first frequency band signal extraction means and the second low frequency band signal outputted from said second frequency band signal extraction means to output a resultant signal;

j) variable addition means for adding together, in a variable arbitrary addition ratio, the first low frequency band signal outputted from said first frequency band signal extraction means and the signal outputted from said first addition means to output a first variable addition signal and for adding together, in a variable arbitrary addition ratio, the second low frequency band signal outputted from said second frequency band signal extraction means and the signal outputted from said first addition means to output a second variable addition signal;

k) second addition means for adding together the first high frequency band signal outputted from said first frequency band signal extraction means and the first variable addition signal outputted from said variable addition means to output a resultant signal; and l) third addition means for adding together the second high frequency band signal outputted from said second frequency band signal extraction means and the second variable addition signal outputted from said variable addition means to output a resultant signal.

4. An apparatus according to claim 3, wherein the addition ratio in which said variable addition means adds together the first low frequency band signal outputted from said first frequency band signal extraction means and the signal outputted from said first addition means to output the first variable addition signal is made to coincide with the addition ratio in which said variable addition means adds together the second low frequency band signal outputted from said second frequency band signal extraction means and the signal outputted from said first addition means to output the second variable addition signal.

5. An audio processing apparatus for processing an audio signal, comprising:

a) a first input terminal arranged to receive a left-side audio signal composed mainly of an audio signal corresponding to a sound coming from a left side;

b) a second input terminal arranged to receive a right-side audio signal composed mainly of an audio signal corresponding to a sound coming from a right side;

c) first delay means for delaying the left-side audio signal received by said first input terminal to output a resultant signal;

d) second delay means for delaying the right-side audio signal received by said second input terminal to output a resultant signal;

e) first subtraction means for subtracting the signal outputted from said second delay means from the left-side audio signal received by said first input terminal to output a resultant signal;

f) second subtraction means for subtracting the signal outputted from said first delay means from the right-side audio signal received by said second input terminal to output a resultant signal;

g) first frequency band signal extraction means for extracting from the signal outputted from said first subtraction means a first low frequency band signal and a first high frequency band signal to output the first low frequency band signal and the first high frequency band signal;

h) second frequency band signal extraction means for extracting from the signal outputted from said second subtraction means a second low frequency band signal and a second high frequency band signal to output the second low frequency band signal and the second high frequency band signal;

i) first addition means for adding together the first low frequency band signal outputted from said first frequency band signal extraction means and the second low frequency band signal outputted from said second frequency band signal extraction means to output a resultant signal;

j) selective output means for selecting one of the first low frequency band signal outputted from said first frequency band signal extraction means and the signal outputted from said first addition means to output the selected one as a first selection signal and for selecting one of the second low frequency band signal outputted from said second frequency band signal extraction means and the signal outputted from said first addition means to output the selected one as a second selection signal;

k) second addition means for adding together the first high frequency band signal outputted from said first frequency band signal extraction means and the first selection signal outputted from said selective output means to output a resultant signal; and l) third addition means for adding together the second high frequency band signal outputted from said second frequency band signal extraction means and the second selection signal outputted from said selective output means to output a resultant signal.

6. An apparatus according to claim 5, wherein a selective output operation which said selective output means performs to select one of the first low frequency band signal outputted from said first frequency band signal extraction means and the signal outputted from said first addition means is made to be associated with a selective output operation which said selective output means performs to select one of the second low frequency band signal outputted from said second frequency band signal extraction means and the signal outputted from said first addition means.

* * * * *

UNITED STATES PATENT AND TRADEMARK OFFICE

CERTIFICATE OF CORRECTION

PATENT NO. : 5,701,344

DATED : December 23, 1997

INVENTOR(S) : Wakui, Tetsuya

It is certified that error appears in the above-identified patent and that said Letters Patent is hereby corrected as shown below:

Col. 1, line 27, delete "make" and insert -- have --.

Col. 5, line 28, after "signals" insert -- and --.

Col. 5, line 52, delete "supplied to" and insert -- output by --.

Col. 7, line 58, delete "supplied to" and insert -- output by --.

Col. 9, line 18, delete "(1•n)" and insert -- (1-n) --.

Col. 9, line 26, delete "(1•n)" and insert -- (1-n) --.

Signed and Sealed this

Thirtieth Day of June, 1998

Attest:

Bruce Lehman

BRUCE LEHMAN

*Attesting Officer*

*Commissioner of Patents and Trademarks*